(12) United States Patent
Tsirkin (10) Patent No.: US 10,880,195 B2
(45) Date of Patent: *Dec. 29, 2020

(54) RPS SUPPORT FOR NFV BY SYSTEM CALL BYPASS

(71) Applicant: Red Hat, Inc., Raleigh, NC (US)

(72) Inventor: Michael Tsirkin, Lexington, MA (US)

(73) Assignee: Red Hat, Inc., Raleigh, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 16/280,698

(22) Filed: Feb. 20, 2019

(65) Prior Publication Data

US 2019/0182139 A1 Jun. 13, 2019

Related U.S. Application Data

(63) Continuation of application No. 15/438,057, filed on Feb. 21, 2017, now Pat. No. 10,230,608.

(51) Int. Cl.
| | |
|---|---|
| *H04L 12/26* | (2006.01) |
| *H04L 29/08* | (2006.01) |
| *G06F 9/54* | (2006.01) |
| *H04L 12/861* | (2013.01) |

(52) U.S. Cl.
CPC .......... *H04L 43/0876* (2013.01); *G06F 9/545* (2013.01); *H04L 49/90* (2013.01); *H04L 69/30* (2013.01); *H04L 67/10* (2013.01)

(58) Field of Classification Search
None
See application file for complete search history.

(56) References Cited

U.S. PATENT DOCUMENTS

| | | |
|---|---|---|
| 6,434,116 B1 | 8/2002 | Ott |
| 6,560,198 B1 | 5/2003 | Ott |
| 8,402,267 B1 | 3/2013 | Graham |

(Continued)

OTHER PUBLICATIONS

Anastopoulos et al., Facilitating Efficient Synchronization of Asymmetric Threads on Hyper-Threaded Processors, National Technical University of Athens School of Electrical and Computer Engineering Computing Systems Laboratory, Apr. 2008 (8 pages).

(Continued)

*Primary Examiner* — Brian Whipple
(74) *Attorney, Agent, or Firm* — K&L Gates LLP (57) ABSTRACT

A system for Receive Packet Steering (RPS) support for Network Function Virtualization (NFV) by system call bypass includes a memory, a plurality of central processing units (CPUs) in communication with the memory, an operating system, and a Network Interface Controller (NIC) including a receive queue. The system also includes a driver thread and a plurality of forwarding threads. The driver thread handles the receive queue of the NIC. In an example, a first forwarding thread of the plurality of forwarding threads executes a system call. The first forwarding thread executes on the first CPU. The system call, when executed, executes a monitor instruction on a first CPU to monitor for updates to a designated memory location and checks a condition. Checking the condition includes reading the designated memory location and determining whether information in the designated memory location indicates that a new packet for the first forwarding thread has arrived.

20 Claims, 6 Drawing Sheets

(56) References Cited

U.S. PATENT DOCUMENTS

| | | |
|---|---|---|
| 2002/0062374 A1 | 5/2002 | Kikuchi |
| 2009/0172304 A1 | 7/2009 | Gueron et al. |
| 2009/0300651 A1 | 12/2009 | Jiang et al. |
| 2010/0322089 A1 | 12/2010 | Raja et al. |
| 2010/0322237 A1 | 12/2010 | Raja et al. |
| 2012/0033673 A1 | 2/2012 | Goel |
| 2012/0226804 A1 | 9/2012 | Raja et al. |
| 2015/0026361 A1 | 1/2015 | Matthews et al. |
| 2017/0070547 A1 | 3/2017 | Falk et al. |
| 2017/0104697 A1 | 4/2017 | Degani et al. |
| 2018/0069793 A1* | 3/2018 | Narayanan ............ H04L 47/215 |

OTHER PUBLICATIONS

Deri, Luca, Improving Passive Packet Capture: Beyond Device Polling, NETikos S.p.A., 2004 (15 pages).
Kernel development, LWN.net, 2003 (7 pages).
Monitoring and Tuning the Linux Networking Stack: Receiving Data, Packagecloud Blog, Jun. 22, 2016 (95 pages).

\* cited by examiner

RPS SUPPORT FOR NFV BY SYSTEM CALL BYPASS

CROSS REFERENCES TO RELATED APPLICATIONS

The present application is a continuation of application Ser. No. 15/438,057 filed on Feb. 21, 2017, the entire content of which is hereby incorporated by reference herein.

BACKGROUND

In order to preserve power resources and lower overhead usage, physical processors may utilize memory monitoring instructions designating a range of memory that allow the physical processor to stop instruction execution. The physical processor executing the monitoring instruction may be blocked from further execution and enter a wait state until there is a change to the designated memory by another physical processor or an inter-processor interrupt is received. Using the x86 instruction set architecture as an example, this feature may include a MONITOR instruction and an MWAIT instruction. The MONITOR instruction causes the processor hardware to monitor a range of memory addresses designated by the MONITOR instruction. If there is a change to the designated memory (e.g., data storing), a signal is triggered within the processor hardware. This signal may be used by the MWAIT instruction. The MWAIT instruction causes the processor to enter a halt state until data has been written to a memory address within the range designated by the MONITOR instruction. If a processor is in a halt state as a result of the MWAIT instruction, a change to the designated memory may trigger a signal to bring that processor out of the halt state.

SUMMARY

The present disclosure provides new and innovative methods and systems for Receive Packet Steering (RPS) support for Network Function Virtualization (NFV) by system call bypass. An example system includes a memory, a plurality of central processing units (CPUs) in communication with the memory, an operating system to execute on the plurality of CPUs, and a Network Interface Controller (NIC) including a receive queue. The example system also includes a driver thread and a plurality of forwarding threads to execute on the plurality of CPUs. The driver thread handles the receive queue of the NIC. In an example, a first forwarding thread of the plurality of forwarding threads executes a system call. The first forwarding thread executes on the first CPU. The system call, when executed, executes a monitor instruction on a first CPU of the plurality of CPUs to monitor for updates to a designated memory location and checks a condition. Checking the condition includes reading the designated memory location and determining whether information in the designated memory location indicates that a new packet for the first forwarding thread has arrived.

Additional features and advantages of the disclosed methods and system are described in, and will be apparent from, the following Detailed Description and the Figures.

DETAILED DESCRIPTION OF EXAMPLE EMBODIMENTS

Described herein are methods and systems for Receive Packet Steering (RPS) support by system call bypass. RPS is a software-based implementation of packet distribution where received packets are distributed across multiple CPUs, which may help prevent the receive queue of a NIC from becoming a bottleneck in network traffic. Using the RPS technique, Network Function Virtualization (NFV) solutions, for example, using a Data Plane Development Kit (DPDK), may pass incoming packets from a driver thread to multiple forwarding threads, depending on the contents of the packets. The forwarding thread may typically block (i.e., the CPU on which the forwarding thread was running may be halted and enter into a lower power state) when there are no packets to handle. In order to block, the forwarding thread may need to issue a system call. When a system call is issued, the CPU on which the forwarding thread is running, may switch a context from a user space mode to a kernel space mode to process the instruction (e.g., block instruction) in a privileged mode, and this context switch may be a source of system latency. In order to wake up the forwarding thread, the driver thread may need to issue another system call when a new packet arrives for the forwarding thread. This may increase the system call overhead, which is not be affordable for a system with demanding workloads, such as an NFV system. One way to reduce the system call overhead may be to have the forwarding threads poll (i.e., continuously check) the user space memory, which is updated by the driver thread when a new packet arrives. However, constantly running the CPU in a polling mode can increase the power requirements of the system significantly.

Aspects of the present disclosure may address the above noted deficiencies. In an example, when a forwarding thread, running on a CPU, determines that there are no packets to process, the forwarding thread may execute a system call. The system call may cause an operating system to execute a monitor instruction (e.g., MONITOR instruction) on the CPU to monitor for updates to a designated memory location. The designated memory location may be the user space memory updated by a driver thread when a new packet arrives for the forwarding thread. The system call may also cause the operating system to check a condition, which may include reading the designated memory location and determining whether a new packet for the forwarding thread has arrived based on the information in the designated memory location. If it is determined that no new packet has arrived, the system call may cause the operating system to execute a memory wait instruction (e.g., MWAIT instruction) on the CPU, which may cause the forwarding thread and the CPU to enter a halt state. If it is determined that a new packet has arrived for the first forwarding thread, the system call may cause the operating system to switch a context from a kernel space (privileged mode) to a user space (non-privileged mode) to process the new packet by the forwarding thread. By checking the condition before executing the memory wait instruction, the presently disclosed system may be capable of detecting whether a new packet has arrived in-between the determination that no new packet has arrived and the execution of the monitor instruction.

At a later time after the memory wait instruction has been executed on the CPU, when a new packet for the forwarding thread arrives in a receive queue of a NIC, the driver thread may retrieve the new packet from the receive queue and submit the new packet to a data structure. Then, the driver thread may update the designated memory location, which may cause the forwarding thread and the CPU to wake up out of the halt state. Then, the forwarding thread may process the new packet by retrieving the new packet from the data structure and submitting it to a destination of the new packet. If there are no more packets to process, the forwarding thread may execute the system call again.

In this way, the forwarding threads may wake up when a new packet arrives without a system call issued from the driver thread. Although the forwarding threads may still need to issue the system call to execute the memory monitoring instructions (e.g., MONITOR and MWAIT instructions), the presently disclosed system may reduce the latency of the system significantly because the system calls may be distributed across multiple forwarding threads instead of being more concentrated on the driver thread. That is, if a driver thread wants to wake up multiple forwarding threads, typically in a system using RPS, the driver thread may need to issue multiple system calls. This may increase the latency of the system significantly because the driver thread may not be able to handle the incoming packets in the receive queue until the driver thread returns to the user space mode after issuing the multiple system calls. This may make the driver thread be a bottleneck in network traffic. However, the presently disclosed system may avoid above noted deficiency because the system calls may be issued by the forwarding threads, instead of the driver thread, and the system calls are distributed across multiple forwarding threads. Furthermore, generally a large number of packets comes to the system at once. Therefore, in the present disclosure, after the first packet, which may wake the forwarding thread out of the memory wait state, arrives, the driver thread may process the packets that follow the first packet and prepare the packets for the forwarding thread while the forwarding thread is waking up and returning to the user space, advantageously resulting in a more efficient system. Accordingly, aspects of the present disclosure may efficiently address requirements for a system with demanding workloads, such as a latency-sensitive NFV system.

In an example, aspects of the present disclosure may also include a false wake-up check function. For example, responsive to a forwarding thread and/or the CPU waking out of the memory wait state, the operating system may execute the monitor instruction on the CPU to monitor for updates to the designated memory location and check the condition by reading the designated memory location and determining whether information in the designated memory location indicates that a new packet for the forwarding thread has arrived. Responsive to determining that the wake-up was a false wake-up (e.g., no new packet has arrived for the forwarding thread), the operating system may execute the memory wait instruction on the CPU. If it is determined that the wake-up was not a false wake-up, the operating system may switch the context from the kernel space to the user space to process the new packet. Additional features and advantages of the disclosed method, system, and apparatus are described below.

Figure 1:
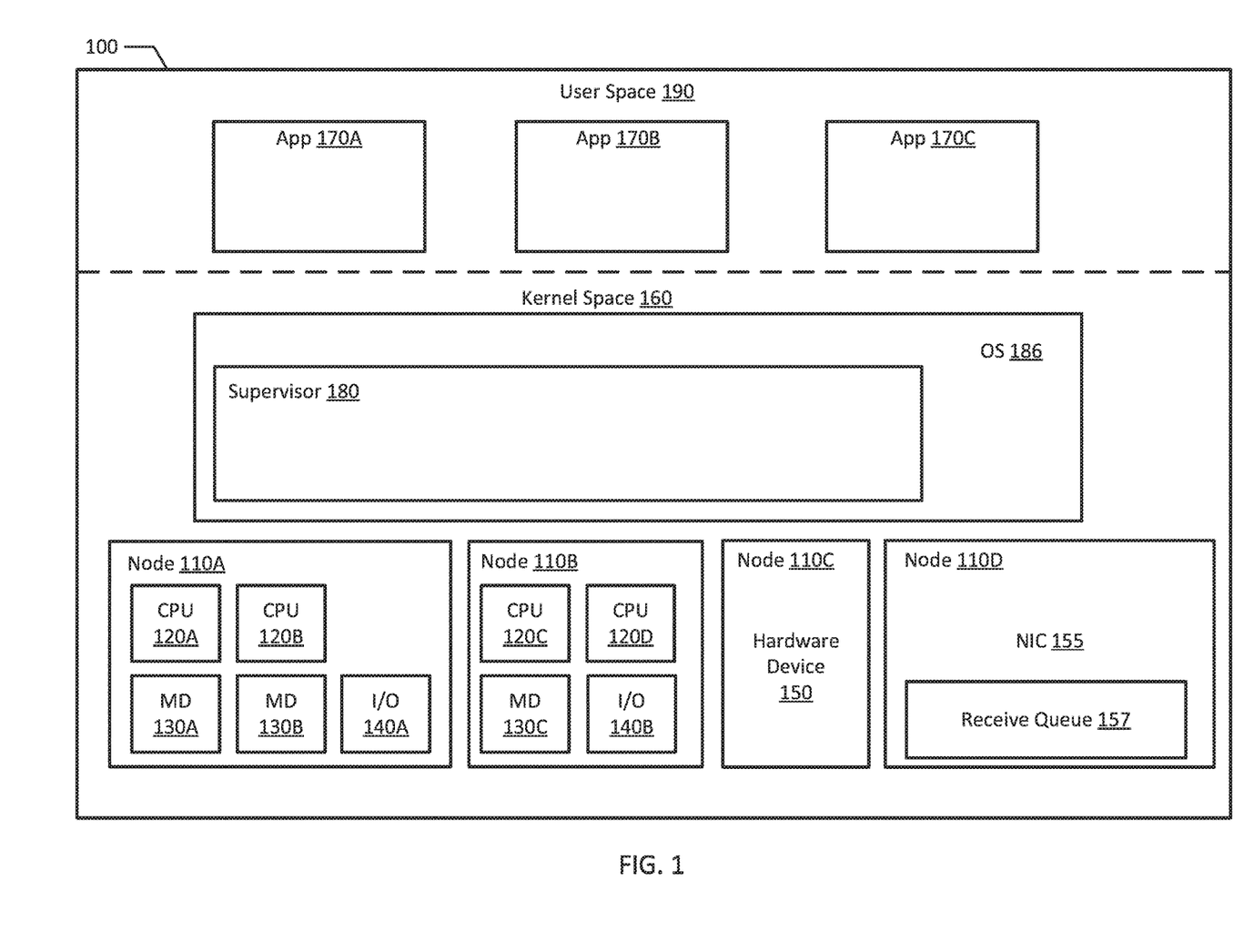
FIG. 1 is a block diagram of an example system for RPS support by system call bypass according to an example embodiment of the present disclosure.

FIG. 1 depicts a high-level component diagram of an example system 100 in accordance with one or more aspects of the present disclosure. The system 100 may include a memory (e.g., MD 130A-C), an operating system (OS) 186, and one or more processors (CPU 120A-D) configured to execute threads. The OS 186 may include a supervisor 180 and an interrupt handler. The supervisor 180 may be a privileged software component of the OS 186. In an example, the supervisor 180 may be implemented as a component of a kernel in the OS 186. The OS 186 and the supervisor 180 may be in a kernel space 160. The supervisor 180 may manage scheduling of threads (e.g., driver threads and forwarding threads) and determine the order various threads are handled. The supervisor 180 may also determine how various threads share the supervisor's processing time. Additionally, the interrupt handler may handle requests from various hardware devices (e.g., Hardware Devices 150) that require the supervisor's service.

Additionally a user may run programs or applications (e.g., Applications 170A-C) in the user space 190. An application (e.g., Applications 170A-C) may be an application in user space, an application in a virtual machine, or an application located elsewhere (e.g., a container), all of which make up the user space 190. The supervisor 180 may provide basic services for the OS 186 that are requested by other parts of the OS 186 or by application programs through system calls.

The system 100 may include one or more interconnected nodes 110A-D. Each node 110A-B may in turn include one or more physical processors (e.g., CPU 120A-D) communicatively coupled to memory devices (e.g., MD 130A-C) and input/output devices (e.g., I/O 140A-B). Node 110C may include a hardware device 150. In an example embodiment, a hardware device (e.g., 150) may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. In an example, Node 110D may be a network interface controller (NIC) 155. The NIC 155 may include a receive queue 157. In an example, the receive queue 157 may be a memory device in the NIC 155. In another example, the receive queue 157 may be a system memory (e.g., MD 130A-C) that is accessible by the NIC 155. The receive queue 157 may store incoming packets.

As used herein, physical processor or processor 120 refers to a device capable of executing instructions encoding arithmetic, logical, and/or I/O operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or processing a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and, hence, share a single socket). A processor may also be referred to as a central processing unit (CPU).

As discussed herein, a memory device 130A-C refers to a volatile or non-volatile memory device, such as RAM, ROM, EEPROM, or any other device capable of storing data. As discussed herein, I/O device 140A-B refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-B and a memory device 130A-B may be provided by one or more local buses of suitable architecture, for example, peripheral component interconnect (PCI).

In an example, a computer or CPU may run a virtual machine by executing a software layer above a hardware layer and below the virtual machine. A virtual machine may be presented as a virtualized physical layer, including processors, memory, and I/O devices. For example, a virtual machine may include virtual processors, virtual memory devices, and/or virtual I/O devices. A virtual machine may execute a guest operating system, which may utilize the virtual processors, virtual memory devices, and/or virtual I/O devices. Additionally, a virtual machine may include one or more applications that run on the virtual machine under the guest operating system. A virtual machine may run on any type of dependent, independent, compatible, and/or incompatible applications on the underlying hardware and OS 186. In an example embodiment, applications run on a virtual machine may be dependent on the underlying hardware and/or OS 186. In another example embodiment, applications run on a virtual machine may be independent of the underlying hardware and/or OS 186. For example, applications run on a first virtual machine may be dependent on the underlying hardware and/or OS 186 while applications run on a second virtual machine are independent of the underlying hardware and/or OS 186. Additionally, applications run on a virtual machine may be compatible with the underlying hardware and/or OS 186. In an example embodiment, applications run on a virtual machine may be incompatible with the underlying hardware and/or OS 186. For example, applications run on one virtual machine may be compatible with the underlying hardware and/or OS 186 while applications run on another virtual machine are incompatible with the underlying hardware and/or OS 186. In an example embodiment, a device may be implemented as a virtual machine.

Figure 2:
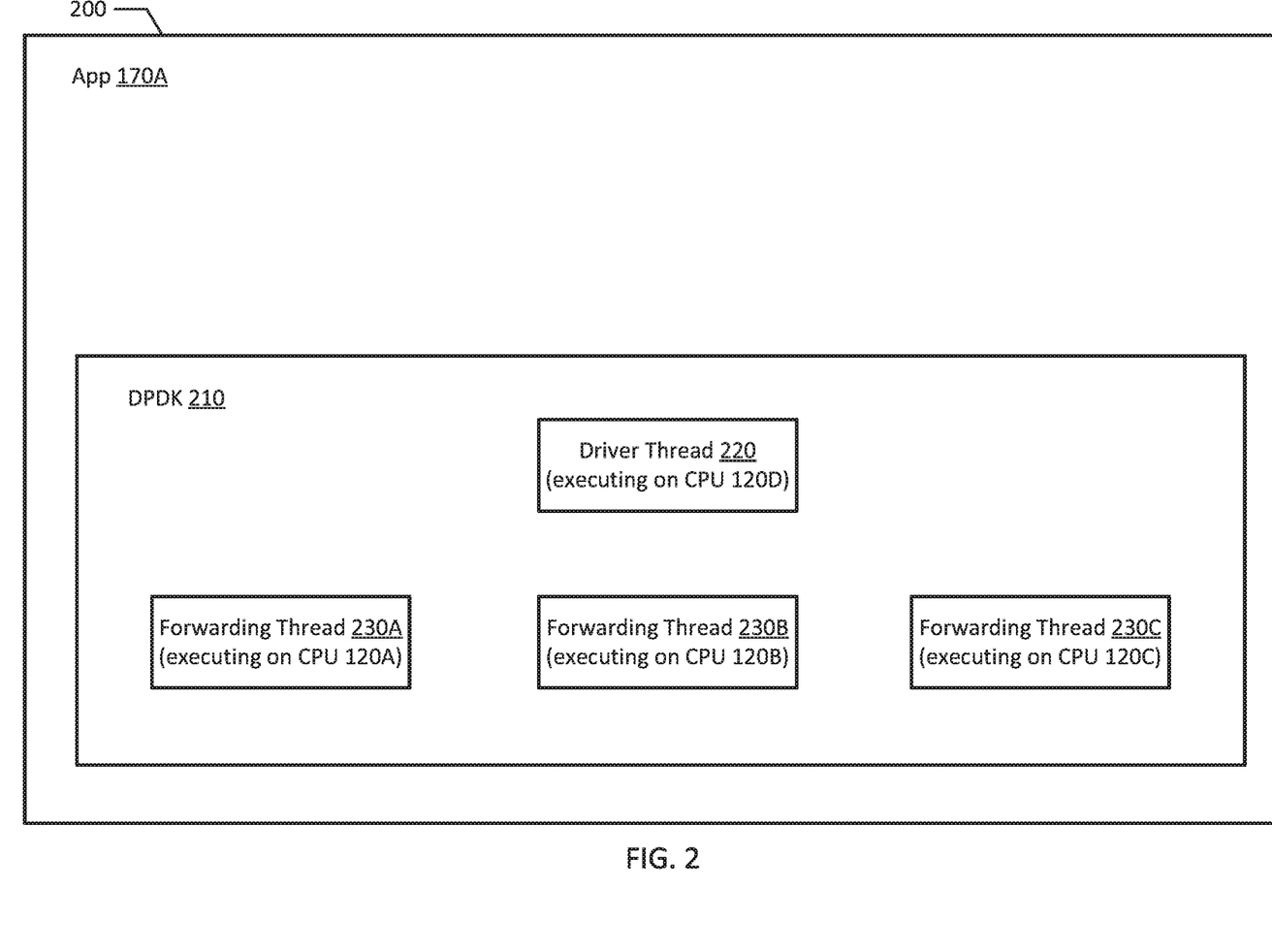
FIG. 2 is a block diagram of an example application according to an example embodiment of the present disclosure.

FIG. 2 shows a block diagram of an example application 170A according to an example of the present disclosure. As illustrated in FIG. 2, an example application 170A may include a driver thread 220 and forwarding threads 230A-C. An example application may include one or more driver threads and one or more forwarding threads. In an example, the application 170A may include a Data Plane Development Kit (DPDK) 210. The DPDK 210 may be a set of data plane libraries and network interface controller drivers that may enable packets to bypass the kernel for fast packet processing. In an example, the DPDK 210 may include a poll mode driver configured to poll the NIC 155 (i.e., scanning the NIC 155 whether packets arrived or not) or the receive queue 157 without using interrupts. In an example, the driver thread 220 and the forwarding threads 230A-C may be a thread of the DPDK 210. In this case, the driver thread 220 may be a thread of the poll mode driver.

In an example, the DPDK 210 may create the driver thread 220 and the forwarding threads 230A-C. When a new packet arrives in the system, the new packet may be placed in the receive queue 157 of the NIC 155. Then, the driver thread 220 may retrieve the packet from the receive queue 157. The DPDK 210 may pass the incoming packet from the driver thread 220 to one of the forwarding threads 230A-C. In another example, an application may not include the DPDK 210. In this case, the driver thread 220 and the forwarding threads 230A-C may be threads of the application 170.

In an example, the driver thread 220 may be configured to handle the receive queue 157 of the NIC 155. For example, the driver thread 220 may poll the receive queue 157 to check whether a new packet has arrived, notify the forwarding threads 230A-C about the arrival of the new packet, and forward the new packet to the forwarding threads 230A-C. In an example, the forwarding threads 230A-C may be configured to process the packets forwarded to the forwarding threads 230A-C. For example, the forwarding threads 230A-C may submit the new packet to a destination of the new packet. Examples of the destination may include, but may not be limited to, an application (e.g., Applications 170A-C) and a virtual machine.

In an example, as illustrated in FIG. 2, there is a single driver thread 220 and multiple forwarding threads 230A-C. In another example, there are more than one driver threads 220 and multiple forwarding threads 230A-C. In an example, each of the threads (e.g., driver thread 220 and forwarding threads 230A-C) may be executing on a separate physical CPU. For example, the driver thread 220 may be executing on CPU 120D and forwarding threads 230A, 230B, and 230C may be executing on CPU 120A, 120B, and 120C, respectively. In another example, each of the threads (e.g., driver thread 220 and forwarding threads 230A-C) may be executing on a separate virtual CPU.

In an example, the CPUs 120A-D or virtual CPUs may distribute, based on distribution of packets by the driver thread 220, a packet processing load among the plurality of CPUs 120A-D or virtual CPUs by applying Receive Packet Steering (RPS). RPS is a software-based implementation of packet distribution, where received packets are distributed across multiple CPUs, which may help prevent the receive queue 157 of the NIC 155 from becoming a bottleneck in network traffic. For example, using RPS, the driver thread 220 may create a hash, for example, from the port number and IP address of the packet, and use the hash to determine to which forwarding thread 230A-C or CPU (e.g., CPU 120A-D or virtual CPU) to forward the packet. In an example, this may be done by the DPDK 210 or the driver thread 220 in the DPDK 210. In an example, by using the hash, the driver thread 220 may be able to forward packets from the same stream of data to the same forwarding thread to increase performance.

Figure 3:
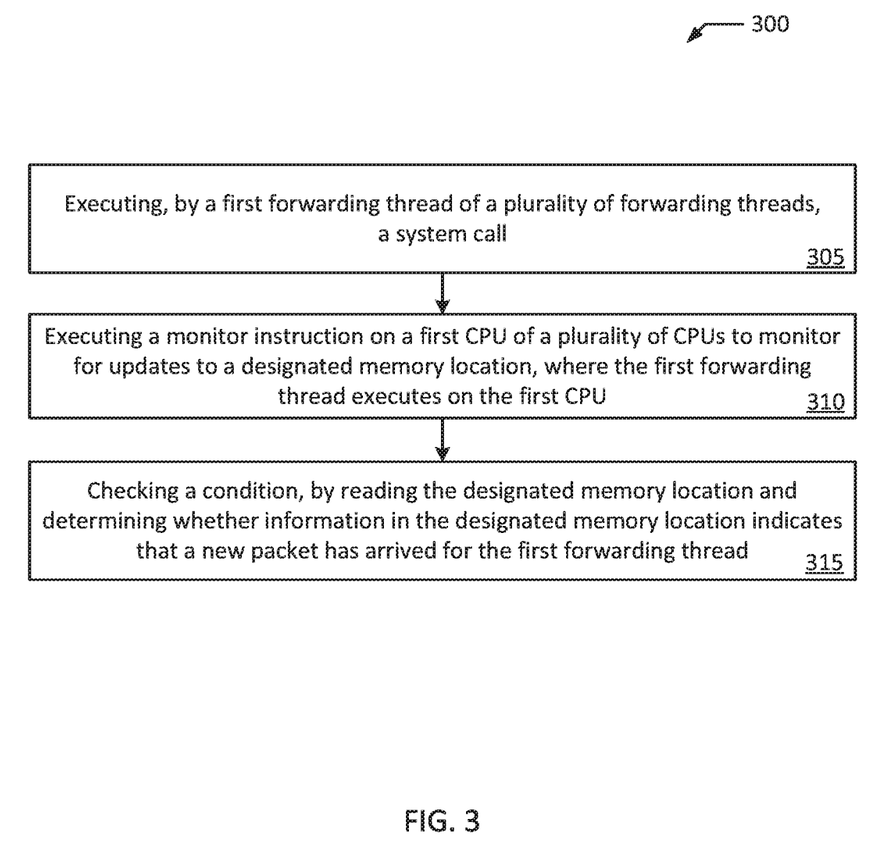
FIG. 3 is a flowchart illustrating an example method for RPS support by system call bypass according to an example embodiment of the present disclosure.

FIG. 3 shows a flowchart of an example method 300 for RPS support by system call bypass. Although the example method 300 is described with reference to the flowchart illustrated in FIG. 3, it will be appreciated that many other methods of performing the acts associated with the method may be used. For example, the order of some of the blocks may be changed, certain blocks may be combined with other blocks, and some of the blocks described are optional.

In the illustrated example, a first forwarding thread of a plurality of forwarding threads executes a system call (block 305). For example, the first forwarding thread 230A in a group of forwarding threads 230A-C may execute a system call. The system call, when executed, executes a monitor instruction on a first CPU of a plurality of CPUs to monitor for updates to a designated memory location, where the first forwarding thread executes on the first CPU (block 310). For example, the system call may execute a monitor instruction on a first CPU 120A in a group of CPUs 120A-C to monitor for updates to a designated memory location (e.g., 7F00), where the first forwarding thread 230A executes on the first CPU 120A.

Then, the system call checks a condition by reading the designated memory location and determining whether information in the designated memory location indicates that a new packet has arrived for the first forwarding thread (block 315). For example, the system call may check a condition by reading the designated memory location (e.g., 7F00) and determining whether information (e.g., in a packet header) in the designated memory location indicates that a new packet has arrived for the first forwarding thread 230A. In an example, each of the plurality of forwarding threads may execute the system call when there are no additional packets to process for each respective forwarding thread. In an example, the plurality of forwarding threads may execute the system call after polling the designated memory location, which may be updated by the driver thread 220, for a predetermined period of time.

In an example, the designated memory location may be in user space memory of the memory devices (e.g., MD 130A-C). The designated memory location may include information about whether a new packet has arrived for the forwarding thread that is monitoring the designated memory location. The designated memory location may include a list of new packets, which may be updated by the driver thread 220. In an example, the OS 186 or the forwarding threads 230A-C may be able to determine whether a new packet has arrived for the forwarding thread 230A-C by reading the list in the designated memory location. In an example, the designated memory location may include a pointer (e.g., a 4 or 8 byte pointer). In this case, the driver thread 220 may update the pointer value when a new packet arrives for the forwarding thread 230A-C and the forwarding thread may wake up out of the memory wait state when the pointer value is updated. In an example, the designated memory location may be read and written by the DPDK 210.

In an example, each of the plurality of forwarding threads 230A-C may designate and monitor a different memory location when the system call is executed. In an example, the driver thread 220 may update the designated memory location for each forwarding thread when a new packet arrives for each respective forwarding thread. For example, when a new packet arrives for a first forwarding thread 230A, the driver thread 220 may update a first designated memory location, which may be monitored by the first forwarding thread 230A. When a new packet arrives for a second forwarding thread 230B, the driver thread 220 may update a second designated memory location, which may be monitored by the second forwarding thread 230B. In this way, the present disclosure advantageously allows the system to be used for a network function virtualization (NFV) system, where the workload is dynamic and the number of messages per event also changes dynamically.

Figure 4A:
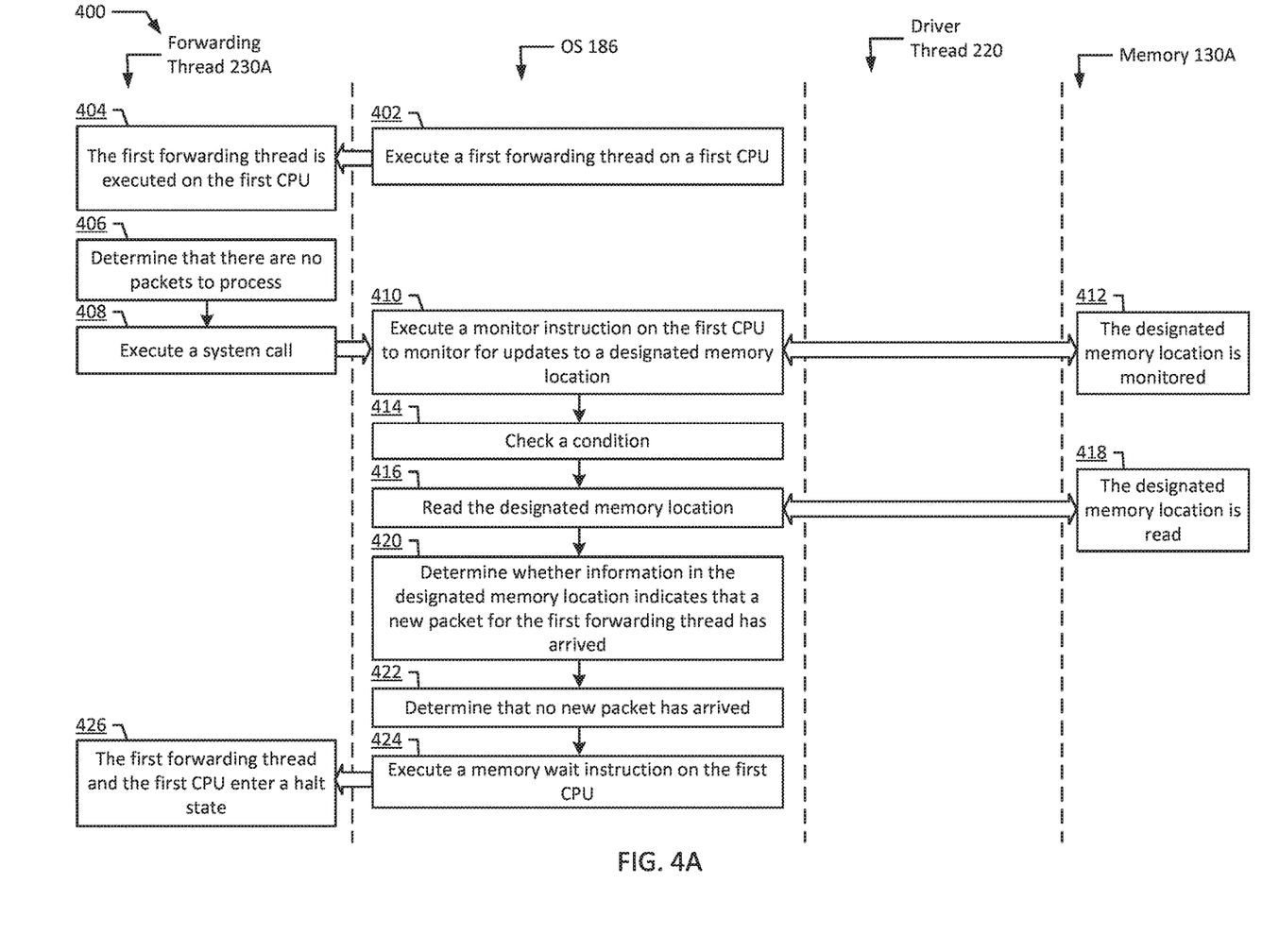
FIGS. 4A and 4B are a flow diagram illustrating an example process for RPS support by system call bypass according to an example embodiment of the present disclosure.
Figure 4B:
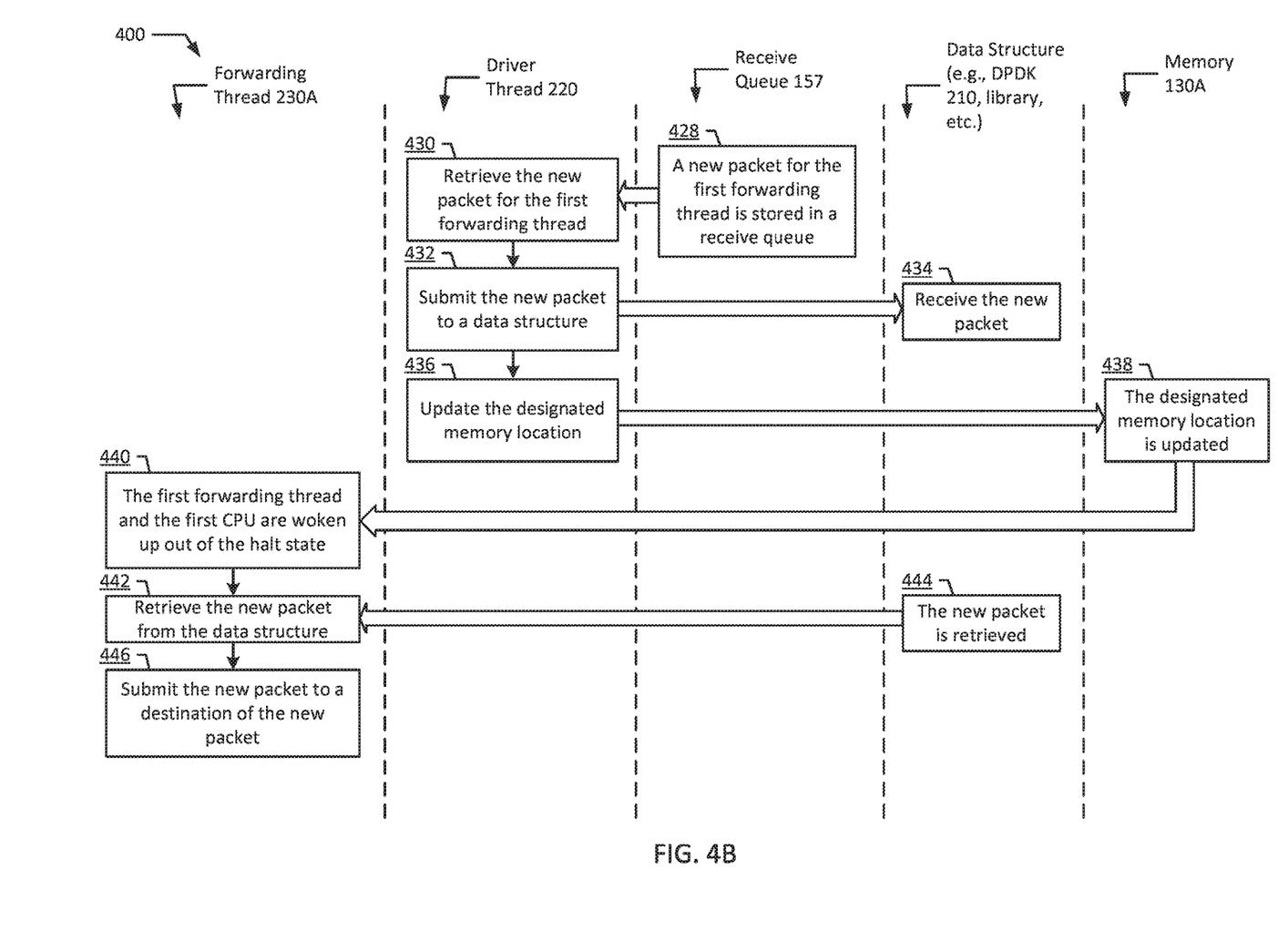

FIGS. 4A and 4B illustrate a flow diagram of an example method 400 for RPS support by system call bypass according to an example embodiment of the present disclosure. Although the example method 400 is described with reference to the flow diagram illustrated in FIGS. 4A and 4B, it will be appreciated that many other methods of performing the acts associated with the method may be used. For example, the order of some of the blocks may be changed, certain blocks may be combined with other blocks, and some of the blocks described are optional. The method 400 may be performed by processing logic that may include hardware (circuitry, dedicated logic, etc.), software, or a combination of both. For example, the method 400 may be performed by a system including forwarding thread 230A, OS 186, driver thread 220, memory 130A, receive queue 157, and/or a data structure (e.g., DPDK 210, library, etc.) communicating and/or interacting with each other.

In the illustrated example, an OS 186 may execute a first forwarding thread 230A on a first CPU (blocks 402 & 404). For example, the OS 186 may execute a first forwarding thread 230A on a first CPU 120A or on a first virtual CPU. In an example, the forwarding thread 230A may determine that there are no packets to process by reading the designated memory location. When the first forwarding thread 230A determines that there are no packets to process (block 406), the forwarding thread 230A may execute a system call (block 408). The system call, when executed, may cause the OS 186 to execute a monitor instruction (e.g., MONITOR instruction) on the first CPU to monitor for updates to a designated memory location (block 410). Then, the designated memory location may be monitored (block 412).

The system call, when executed, may also cause the OS 186 to check a condition (block 414). Checking the condition may include reading the designated memory location (blocks 416 & 418) and determining whether information in the designated memory location indicates that a new packet for the first forwarding thread 230A has arrived (block 420). If it is determined that no new packet has arrived for the first forwarding thread 230A (block 422), the system call may cause the OS 186 to execute a memory wait instruction (e.g., MWAIT instruction) on the first CPU (block 424). This may cause the first forwarding thread 230A and the first CPU to enter a halt state (block 426). When the forwarding threads 230A-C are executing the system call and/or in the memory wait state, the OS 186 may consider the forwarding threads 230A-C busy (i.e., not idle) and, thus, may not attempt to preempt the forwarding threads 230A-C by scheduling another task on the CPUs on which the forwarding threads were running.

In an example, if it is determined that a new packet has arrived for the first forwarding thread 230A at block 420, the system call may cause the OS 186 to switch a context from a kernel space (privileged mode) to a user space (non-privileged mode) to process the new packet by the first forwarding thread 230A. Then, the first forwarding thread 230A may retrieve the new packet from a data structure after it is determined that the new packet has arrived for the first forwarding thread 230A and submit the new packet to a destination of the new packet. In this way, the system may be capable of checking whether a new packet has just arrived in a period of time immediately after it is determined that no new packet has arrived and/or in a period of time immediately before the monitor instruction was executed. That is, if a new packet has arrived after it is determined that no new packet has arrived at block 406 but before the monitor instruction was executed at block 410, the driver thread 220 may update the designated memory location about this new packet before the memory wait instruction is executed. If there were no check functions as described in blocks 414-420, this new packet may not be detected until another packet arrives for the forwarding thread after the memory wait instruction was executed.

At a later time after the memory wait instruction has been executed, a new packet for the first forwarding thread 230A is stored in a receive queue 157 (block 428). Then, the driver thread 220 may retrieve the new packet for the first forwarding thread 230A (block 430). For example, the driver thread 220 may keep polling the receive queue 157 for a new packet and retrieve the new packet when detecting that the new packet has arrived in the receive queue 157. Then, the driver thread 220 may submit the new packet to a data structure (blocks 432 & 434). In an example, the driver thread 220 may determine to which forwarding thread 230A-C to forward the new packet. When the driver thread 220 determines to forward the new packet to the first forwarding thread 230A, the driver thread 220 may submit the packet to a location in the data structure assigned to the first forwarding thread. In an example, the data structure may be a library (e.g., a library in the DPDK 210), a list, a queue, and combinations thereof. In an example, the data structure may include multiple memory locations assigned to each of the forwarding threads 230A-C.

The driver thread 220 may update the designated memory location (blocks 436 & 438), which may cause the first forwarding thread 230A and the first CPU to wake up out of the halt state (block 440). Then, the forwarding thread 230A may retrieve the new packet from the data structure (blocks 442 & 444). Then, the forwarding thread 230A may submit the new packet to a destination of the new packet (block 446). In an example, after submitting the new packet to the destination, the forwarding thread 230A may poll the designated memory location for a while for a new packet. Then, if there are more new packets to process, the forwarding thread 230A may process the packets. If there are no more packets, for example, within a predetermined amount of time, the forwarding thread 230A may repeat the above described blocks 406 to 426.

In an example, responsive to a wake-up of the first CPU out of the halt state at block 440, the OS 186 may repeat the activities described above in blocks 410, 414, 416, 420, and 424 to check for a false wake-up. For example, responsive to a wake-up of the first CPU, the OS 186 may execute the monitor instruction on the first CPU to monitor for updates to the designated memory location and check the condition by reading the designated memory location and determining whether information in the designated memory location indicates that a new packet for the first forwarding thread 230A has arrived. Responsive to determining that the wake-up was a false wake-up (e.g., no new packet has arrived for the first forwarding thread 230A), the OS 186 may execute the memory wait instruction on the first CPU. If it is determined that the wake-up was not a false wake-up, the OS 186 may switch a context from a kernel space 160 (kernel/privileged mode) to a user space (user/non-privileged mode) to process the new packet by the first forwarding thread 230A. In an example, all or some of the steps described as being performed by the OS 186 (e.g., blocks 402, 410, 414, 416, 420, 422, 424, etc.) may be performed by the supervisor 180. In an example, in case the CPU is a virtual CPU, all or some of the steps described as being performed by the OS 186 (e.g., blocks 402, 410, 414, 416, 420, 422, 424, etc.) may be performed by a guest operating system.

In an example, on some CPUs, the monitor instruction (e.g., MONITOR) and the memory wait instruction (e.g., MWAIT) may be included in a single instruction. In this case, the system 400 may not check the condition or may check the condition before executing the monitor and memory wait instruction.

Figure 5:
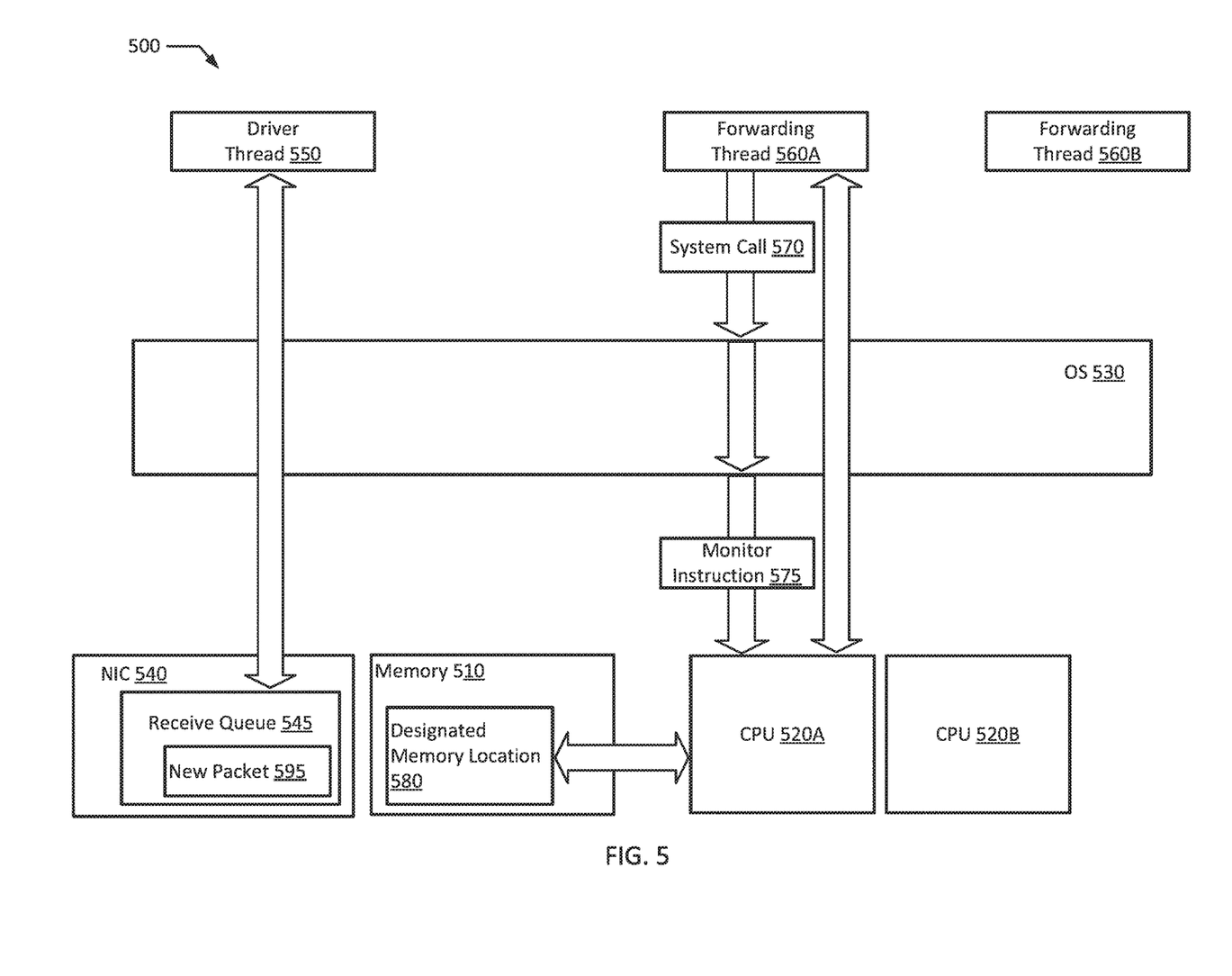
FIG. 5 is a block diagram of an example system according to an example embodiment of the present disclosure.

FIG. 5 shows a block diagram of an example system according to an example of the present disclosure. As illustrated in FIG. 5, an example system 500 may include a memory 510, a plurality of CPUs 520A-B in communication with the memory 510, an operating system 530 to execute on the plurality of CPUs 520A-B, and a Network Interface Controller (NIC) 540 including a receive queue 545. The example system 500 also includes a driver thread 550 and a plurality of forwarding threads 560A-B to execute on the plurality of CPUs 520A-B. The driver thread 550 handles the receive queue 545 of the NIC 540. In an example, a first forwarding thread 560A of the plurality of forwarding threads 560A-B executes a system call 570. The first forwarding thread 560A executes on the first CPU 520A of the plurality of CPUs 520A-B. The system call 570, when executed, executes a monitor instruction 575 on the first CPU 520A to monitor for updates to a designated memory location 580 and checks a condition. Checking the condition includes reading the designated memory location 580, and determining whether information in the designated memory location 580 indicates that a new packet 595 for the first forwarding thread 560A has arrived. Accordingly, the presently disclosed system may advantageously enable the forwarding threads be woken up without a system call issued from the driver thread. This may also reduce the latency of the system significantly because the system calls may be distributed across multiple forwarding threads, instead of one driver thread. Also, when a large number of packets comes to the system at once, more packets may be accumulated in the data structure and prepared for the forwarding thread while the forwarding thread is waking up out of the memory wait state and returning to the user space, advantageously resulting in a more efficient system.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

The example embodiments may be embodied in the form of computer-implemented processes and apparatuses for practicing those processes. An embodiment may also be embodied in the form of a computer program code containing instructions embodied in tangible media, such as floppy diskettes, CD-ROMs, DVD-ROMs, hard drives, or any other computer readable non-transitory storage medium, wherein, when the computer program code is loaded into and executed by a computer, the computer becomes an apparatus for carrying out the method. An embodiment may also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for carrying out the method. When implemented on a general-purpose microprocessor, the computer program code segments configure the microprocessor to create specific logic circuits.

It should be understood that various changes and modifications to the example embodiments described herein will The invention is claimed as follows:

1. A method comprising:
executing a monitor instruction on a first central processing unit (CPU) of a plurality of CPUs to monitor, by a first forwarding thread of a plurality of forwarding threads, for updates to a designated memory location, wherein the first forwarding thread executes on the first CPU, wherein the plurality of forwarding threads execute on the plurality of CPUs; and
determining whether information in the designated memory location indicates that a new packet for the first forwarding thread has arrived, wherein the designated memory location is configured to be updated by a driver thread executing on the plurality of CPUs.

2. The method of claim 1, further comprising responsive to determining that no new packet has arrived for the first forwarding thread, executing a memory wait instruction on the first CPU, causing the first forwarding thread to enter a halt state.

3. The method of claim 1, wherein the designated memory location is updated by the driver thread when the new packet has arrived for the first forwarding thread, wherein updating the designated memory location by the driver thread brings the first forwarding thread out of a halt state.

4. The method of claim 1, further comprising:
creating, by the driving thread, a hash; and
using, by the driving thread, the hash to determine to which forwarding thread among the plurality of forwarding threads to forward a packet.

5. The method of claim 4, wherein the hash is created based on a port number or an IP address of the packet.

6. The method of claim 1, wherein the designated memory location includes a list or a pointer, wherein the designated memory location is updated by updating the list or the pointer.

7. The method of claim 1, further comprising:
retrieving, by the first forwarding thread, the new packet after it is determined that the new packet has arrived for the first forwarding thread;
submitting the new packet to a destination of the new packet;
after submitting the new packet to the destination of the new packet, polling, by the first forwarding thread, the designated memory location for a predetermined amount of time; and
responsive to determining that there are no more packets to process after the predetermined amount of time, making the first forwarding thread to enter a halt state.

8. The method of claim 1, wherein each of the plurality of forwarding threads is configured to monitor a different designated memory location.

9. A method comprising:
retrieving, by a driver thread, a packet from a queue of a network interface controller (NIC), wherein the driver thread executes on a plurality of central processing units (CPUs);
forwarding, by the driver thread, the packet to a first forwarding thread of a plurality of forwarding threads executing on the plurality of CPUs; and
monitoring, by the first forwarding thread, a designated memory location, wherein the designated memory location includes information about whether a new packet for the first forwarding thread has arrived.

10. The method of claim 9, wherein the first forwarding thread enters a halt state by a memory wait instruction when it is determined that no new packet has arrived for the first forwarding thread.

11. The method of claim 9, wherein the designated memory location is updated by the driver thread when the new packet has arrived for the first forwarding thread.

12. The method of claim 9, further comprising:
creating, by the driving thread, a hash; and
using, by the driving thread, the hash to determine to which forwarding thread among the plurality of forwarding threads to forward the packet.

13. The method of claim 12, wherein the hash is created based on a port number or an IP address of the packet.

14. The method of claim 9, wherein the designated memory location includes a list or a pointer, wherein the designated memory location is updated by updating the list or the pointer.

15. The method of claim 9, further comprising:
retrieving, by the first forwarding thread, the packet after it is determined that the packet has arrived for the first forwarding thread;
submitting the packet to a destination of the packet;
after submitting the packet to the destination of the packet, polling, by the first forwarding thread, the designated memory location for a predetermined amount of time; and
responsive to determining that there are no more packets to process after the predetermined amount of time, making the first forwarding thread to enter a halt state by a memory wait instruction.

16. The method of claim 9, wherein each of the plurality of forwarding threads is configured to monitor a different designated memory location.

17. A method comprising:
retrieving, by a driver thread, a packet from a queue of a network interface controller (NIC), wherein the driver thread executes on a plurality of central processing units (CPUs);
identifying, by the driver thread, a first forwarding thread from a plurality of forwarding threads executing on the plurality of CPUs for processing the packet in view of information in the packet;
updating, by the driver thread, a designated memory location associated with the first forwarding thread;
reading, by the first forwarding thread, the designated memory location, wherein information in the designated memory location indicates that a new packet has arrived for the first forwarding thread.

18. The method of claim 17, wherein the first forwarding thread enters a halt state by a memory wait instruction when it is determined that no new packet has arrived for the first forwarding thread.

19. The method of claim 17, wherein the information in the packet includes a hash, wherein the driver thread uses the hash when determining in which forwarding thread among the plurality of forwarding threads the packet will be processed.

20. The method of claim 19, wherein the hash is created based on a port number or an IP address of the packet.

* * * * *